Figure 1A:
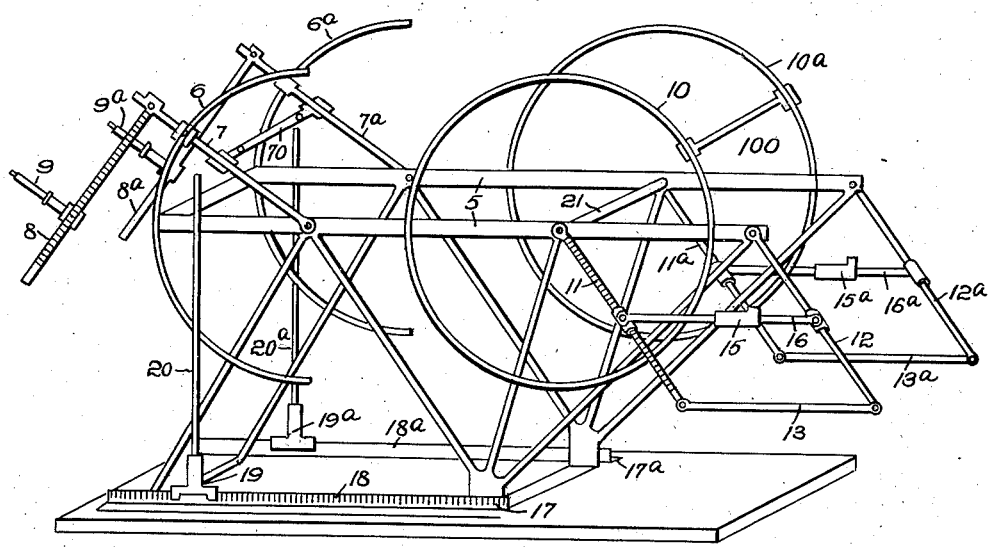

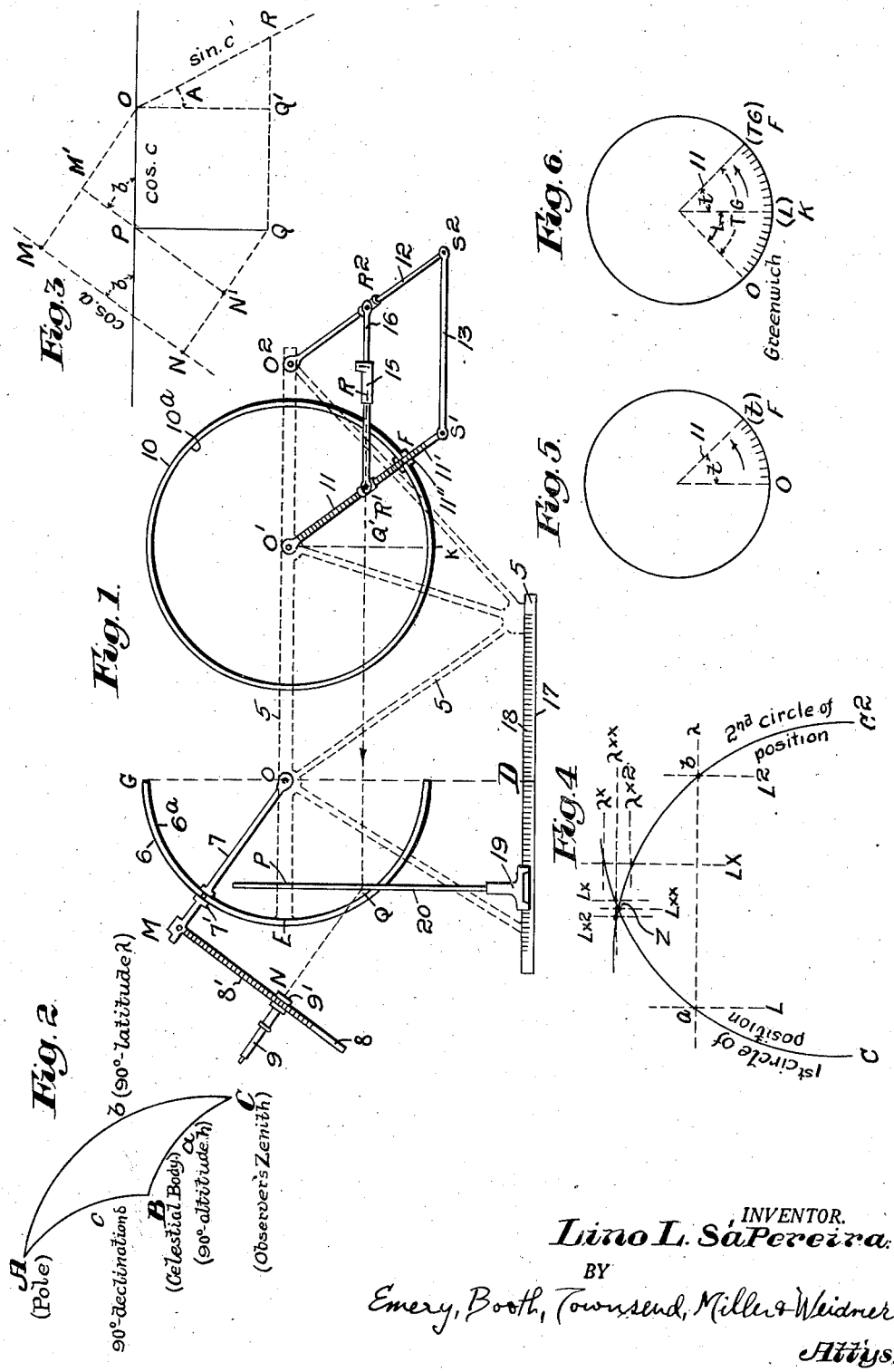

June 10, 1947.  L. L. SÁ PEREIRA  2,421,965
NAVIGATIONAL COMPUTING MEANS
Filed April 22, 1944  2 Sheets-Sheet 2

Inventor:
Lino L. Sá Pereira.
by Emery, Booth, Townsend, Miller & Weidner
Attys

Patented June 10, 1947

2,421,965

UNITED STATES PATENT OFFICE 2,421,965

NAVIGATIONAL COMPUTING MEANS

Lino L. Sa Pereira, Washington, D. C.

Application April 22, 1944, Serial No. 532,289

9 Claims. (Cl. 33—1)

The present invention relates to means for instrumentally or mechanically performing certain computations, whereby an unknown value may readily be determined from other related values which are known or available, as for example the cases in spherical trigonometry involving three sides and one angle, or, conversely, three angles and one side. While the invention is broadly applicable to various fields of use it is especially pertinent to the art of navigation, particularly celestial navigation and position locating whether on sea, in the air or on the land. The invention accordingly aims to provide simple and easily manipulated means for the indicated purposes, such as for rapidly obtaining such data as the latitude and longitude with reference to an observer or navigator.

Accordingly the instrumentalities as herein disclosed represent, on the one hand, means for mechanically solving for example the equation of spherical trigonometry where three sides and an angle are concerned, or, conversely, three angles and a side. Further, such means serves to translate into mechanical terms a herein disclosed geometrical solution of such equation. Again, the means of the invention provide for solving the specific problem of determining latitude and longitude of an observer when two observations of altitude of two celestial bodies (or of a single body at two different times) have been made, or from otherwise obtained observational data, such problem requiring the solving of two simultaneous spherical triangles.

In the accompanying drawing illustrating typical means of the invention by way of example, and whereby the methods thereof may be practiced, Fig. 1 is a largely diagrammatic or schematic representation of an instrumental unit or assembly;

Fig. 1A, sheet 2, is a perspective view of a corresponding duplex instrumental unit;

Figs. 2, 3 and 4 are explanatory diagrams, Fig. 2 being a spherical triangle illustrative of the typical problem involved, in its single aspect, Fig. 3 illustrating certain geometrical relations involved in the instrument of Fig. 1, and Fig. 4 being a further graphic representation explanatory of the use of the instrument of the invention and of the method involved in obtaining true latitudes and longitudes; and Figs. 5 and 6 are further diagrammatic views illustrating certain settings for one part of the instrument of Fig. 1.

Since in its simplest or fundamental aspect the invention involves the solution of certain trigonometric equations, let us first consider one such equation, by reference to Fig. 2. This represents a typical spherical triangle, the three sides of which are designated as $a$, $b$, $c$ and its angles as ABC. The equation relating the sides and one angle, taking for example angle A, is:

$$\cos a = \cos b \cos c + \sin b \sin c \cos A$$

Referring now to Fig. 3, this represents a geometrical construction for the solution of such equation. Let it be assumed for instance that we wish to find side $a$, the sides $b$ and $c$ and angle A being known. A straight line OP is drawn, equal to $\cos c$. Line OR is drawn equal to sine $c$ and making an angle A with the perpendicular from the line PO at O. From R on OR a line QR is drawn parallel to PO, this line meeting perpendiculars from the points P and O of line PO at the points Q and Q' respectively. The right-angled contour OPQ is then projected onto a line MN which makes an angle $b$ with the line OP extended. The indicated line M'N' is parallel to MN through the point P. Thus we have the following values:

$$OP = \cos c$$
$$PQ = OQ' = \sin c \cos A$$

By projecting, it is seen that $$PN' = PQ \sin b = \sin b \sin c \cos A$$
$$M'P = OP \cos b = \cos b \cos c$$
$$MN = M'N' = M'P + PN' = \cos b \cos c + \sin b \sin c \cos A = \cos a$$

Hence the value for MN gives a value for the element sought, namely the side $a$, expressed as cosine.

The instrument of the invention presents mechanical means affording solutions of equations such as referred to in connection with Fig. 2, upon similar principles as set out in the geometric diagram of Fig. 3.

Turning now to Fig. 1, a partly diagrammatic side elevation of the instrument as a whole, the latter comprises a suitable frame indicated generally by the numeral 5 and shown in skeleton form for sake of clearness. An upper portion or member of the frame defines a straight line containing the points marked EPOO' and $O^2$. This line will hereinafter generally be referred to as the line of centers. At the left end of this frame member there is fixedly supported a circle or arc 6, hereinafter usually called the latitude circle. The term "circle" is used for convenience, although said part 6 need not comprise more than about a one-half circle, as illustrated, and in many instances may be reduced to little more than a quadrant, including about a quarter-circle above the line of centers and a relatively short arc below it. This latitude circle 6 is accurately centered, stationarily, at the point O upon the line of centers.

An alidade or pointer 7 having one end fixedly pivoted at said center O is adapted to sweep along the circle 6. It preferably is of a length to project beyond the circle, and is equipped with clamping means as at 7' for securing it in selected position along the circle. At a convenient point on the alidade 7, preferably outside the circle 6 substantially as shown, an arm or graduated bar 8 is mounted, removably if desired, but in accurate perpendicular relation to the alidade. This bar 8 carries a scale as at 8' graduated in values of cosine, reading from the longitudinal center line of the alidade 7. The point of right-angled intersection of the line of the alidade with the line of the cosine scale-bar 8 is designated at M.

On the bar 8 is mounted a small telescope or sighting glass 9 having a line of sight NQ, shown dotted on the drawing, perpendicular to the bar 8 and hence accordingly is parallel to the line MO of the alidade 7. This sighting glass is held by means of a slidable clamp 9', so that it may be adjusted along the bar and set at the appropriate point N on the cosine scale 8'. It will be noted that the sight line NQ and the alidade have a similar relation as the lines NQ and MO of the geometrical Fig. 3. In particular cases to be referred to the cosine value at N, on the scale 8' of bar 8, corresponds to side $a$ of the Fig. 2 spherical triangle.

The instrument further comprises a second circle 10, hereinafter called the longitude circle. It is rotatably mounted on the frame 5 with its center O' in the line of centers, means being provided for releasably clamping it in selected positions of angular adjustment. Associated with this longitude circle 10 is an articulated device defining a parallelogram O'O²S'S², in which O' is the said center of the longitude circle, O² is a fixed point on the instrument frame 5 in the extended line of centers, S' is a point on an alidade or pointer arm 11 pivoted to swing about the center O', and S² is a point on another arm 12 pivoted on the frame at the point O². The distances O'S' and O²S² on the alidade 11 and on the parallel arm 12 are equal, and the latter are pivotally connected by a link 13 equal in length to the distance O'O² on the line of centers.

The chief function of this articulate parallelogram is to define a straight line RQ which shall be parallel to the line of centers EPOO'O² whatever position the alidade 11 may assume.

Such straight parallel line is herein established by means of a small light projector or light source 15 adapted to direct a beam of parallel light crossed by the shadow of a reticle, cross hairs or the like in the projector, which latter may be similar in general to a galvanometer lamp. It is mounted in line with a supporting bar 16 of the same length as the distances O'O² and S'S² and having its ends pivotally and slidably connected at the points R'R² with the alidade 11 and the arm 12 respectively. Thus the mounting of the light-projector bar 16 is such that the latter and the light-beam line RQ may be adjusted in self-parallelism and may be set at the appropriate point along the alidade or pointer arm 11, on which is a scale 11' graduated in sine values, reading away from O'. In a particular case such setting at the alidade scale 11' will correspond to the sine of the side $c$ of the Fig. 2 triangle.

On Fig. 1 a dotted line is indicated perpendicular to the line of centers at the point O', intersecting the beam line RQ at Q' and meeting the longitude circle 10 at its bottom point K. This point K is the location at which the 0 (zero) of the degree scale of the longitude circle 10 is set for solving a single triangle, while for latitude-longitude computations it is the point at which the desired longitude value will be read, as will be explained later.

By comparison of Fig. 1 with Fig. 3, it will be seen that the second or longitude alidade 11 with its sine scale 11' correspond to the line OR of Fig. 3; also that in Fig. 1 the line O'R' of alidade 11 defines an angle with the line O'Q'K which is the angle A of Fig. 3. Shifting of the beam line RQ, parallel always to itself and to the line of centers OO'O², toward or from the latter, as provided for by the parallelogram, effects for any given setting of the light-supporting bar 16 along the sine scale of the alidade 11 a corresponding variation of the angle concerned. The alidade 11 in the course of such adjustment sweeps along the longitude circle 10 and is adapted to be set at the appropriate degree marking thereon, as at the point F, by suitable sliding clamp means indicated at 11''.

The instrument of the invention further comprises means for determining intersection of the sight line NQ of the telescope 9 and the beam line RQ of the projector 15 at a point upon a plane perpendicular to beam-line and to the line of centers EPOO'O² and at a perpendicular distance from the point O calculated in a similar manner as the line-distance PO of Fig. 3; that is, in the selected example, in values of cosine of the side $c$ of the Fig. 2 triangle. Said point of linear intersection corresponds to the point Q of the geometric diagram Fig. 3, and is accordingly likewise designated Q in Fig. 1.

For visually determining this intersection point Q the instrument has at a lower portion of its frame 5 a track, scale-bar or rule 17 carrying a cosine-graduated scale 18 having its origin at D in perpendicular line to the line of centers at the center O of the latitude circle 6, the scale reading oppositely in either direction from D. On this graduated track 17, parallel to the line of centers, is slidably mounted a carrier 19 for an intersection-element, planar ground or viewing surface 20, hereinafter generally called the view strip. This element is of adequate rigidity to define and maintain a true plane surface perpendicular to the line of centers POO', and to its supporting base 17. It presents such surface in intersecting relation to the sight line NQ of the telescope 9, so that points on the surface may be observed thereby. This view strip 20 is of a transparent or translucent material, such that the light beam received from the projector 15 along the line QR, always parallel to the line of centers PEOO' and hence also perpendicular to the view strip 20, will be transmitted through the view strip and will produce a visual spot, point or light configuration on that plane surface of the view strip which faces the telescope. This spot, designated in Figs. 1 and 3 by the letter Q, and which may be the shadow of the crosshairs of the light projector, defines the meeting or intersection of the two straight lines NQ, the line of sight of the telescope 9, and RQ, the beam line from the projector 15. The viewing surface of the strip 20 facing the telescope 9 is suitably prepared readily to display this intersection point Q, as by providing it with a ground, frosted or mat condition or by applying a thin coating, as appropriate to the composition of the transparent or other material employed.

From the foregoing description of the mechanism of Fig. 1 and a comparison thereof with Fig. 3, it is evident that the geometric solution of the latter figure is in effect translated into terms of mechanical solution of the problem by the means of Fig. 1. And with reference to the four elements of the triangle of Fig. 2 the instrument affords means for embodying changes in value of one of said elements as a function of the values of another of them, when the other two of the four elements concerned are regarded as constant.

Assume for example that sides $a$ and $c$ are constant. Through the instrument we may trace the dependence of one of the other elements, say side $b$, as a function of the remaining element, the angle A. In such case the light-projector bar 16 and also the view strip 20 are respectively set with reference to their sine and cosine scales 11' and 18, in this instance according to the value of side $c$. The telescope 9 is set at a point along its cosine scale 8' in accordance with the value of the side $a$. The alidade 11 of the parallelogram is then moved slowly along its circle 10 and simultaneously the alidade 7 is shifted along its circle 6, while the observer looks through the telescope 9. For each position of the alidade 11 there will be found an angular position of the alidade 7 which produces on the viewing surface of the view strip 20 a condition of intersection of the light beam QR and of the sight line NQ. Taking the point K on the circle 10 as the 0 (zero) point and the point G of the circle 6 as its 0 (zero) point, the degree readings at the point F on circle 10 and opposite the point M on the circle 6 will respectively be the desired angle A and the angle (side) $b$.

The mutual dependence of any two elements of the triangle, the two others being supposed constant, may be similarly studied. It will be noted that in the instrument one of the sides of the triangle (side $c$ as referred to in Figs. 1 and 3) is represented twice, that is, once on sine scale 11' and once on cosine scale 18. It is therefore important in any instance to select as the twice-represented element (such as side $c$ in the example) one of the sides which is assumed as constant.

To this point we have considered the invention only in relation to the solution of a single spherical triangle, such as that of Fig. 2. As previously stated, the invention is particularly adapted for use in solving the specific problem of determining the latitude and longitude of an observer, when altitude observations of two celestial bodies, or of one and the same body at two different times, have been made. This problem necessitates solving two simultaneous equations of spherical triangles. Obviously a first step is the solution of one triangle. Such solution has already been demonstrated with reference to the apparatus of Fig. 1. In the further description of the instrument it will be pointed out how it is adapted to the purposes of the larger problem stated.

Customarily the method of computation used by a navigator for locating his position, after having made the observations above mentioned, involves various calculations and drawings on charts, which are laborious and time-consuming. Even these tedious computations are in the nature of a short-cut, in an effort to avoid carrying out completely the true solution, namely, the solving of two simultaneous equations of spherical triangles. And in said usual methods the accuracy of the results is to a large degree dependent on the reliability of the navigator's initial assumption as to his approximate position.

By contrast with this customary procedure, the method and means of the invention readily affords the solution of the true problem of simultaneous equations involved, without written computations or drawings. Further, the observer or navigator is relieved of the uncertainties attendant on the necessity of making an initial guess, happy or otherwise, as to his approximate location.

It is assumed here, as in the usual procedure, that true altitudes above the horizon are known, i. e. that the proper corrections have already been introduced to allow for refraction, parallax, dip and semi-diameter, if and when called for. The Greenwich mean time of each observation also is assumed known.

It is understood that one single observation is not sufficient for obtaining an observer's location. Two observations are needed. These are of the same kind, and the part played by one is similar to that played by the other. The term "observation" herein will be understood as including data of the character concerned however obtained.

If we discard for the moment the travel of the ship, plane or other vehicle in the time between observations, i. e., assume the observer has not moved relative to the earth's surface, his location is given by the intersection of two circles on the earth's surface, each defined by one observation. This definition of location by two intersecting circles, while obvious, is here emphasized to assist in an understanding of the dual symmetrical character of the instrument structure. In effect two duplicatory sets of parts are provided in the instrument. One of these is to take care of one observation, and a second set, symmetrically disposed, to take care of the other.

Now referring again to Fig. 2, previously considered as representing any spherical triangle, let it now represent a celestial triangle, wherein A is the pole, B is the celestial body and C is the zenith of the observer. Then, as indicated by the legends on Fig. 2: $a$ is zenith distance of the observed body $= 90° - h$ ($h$ = altitude); $b$ is polar distance of the observer $= 90° - \lambda$ ($\lambda$ = latitude); $c$ is polar distance of the observed body $= 90° - \delta$ ($\delta$ = declination). Angle A now represents the local hour-angle of the observed body $= t$.

Two of these elements are known as a result of the observation, namely $a$ and $c$ or their complements $h$ and $\delta$. The other two elements $b$ and A are unknown, being respectively the latitude and the local-hour-angle of the observed body. The four elements are related by the equation of the spherical triangle, already considered. By using the described instrument we are now able to follow, for instance, the variations of $b$, i. e. of $\lambda$ (latitude) according to the change of the hour-angle $t$.

For the purposes of these navigational computations, the parts of the instrument as already described with reference to Fig. 1, will be understood as duplicated, in side by side relation; that is, if the plane of the drawing sheet represents one set of the parts, the same are duplicated upon another sheet parallel to the first and either in front of or behind the latter, with the corresponding points in lateral alignment, perpendicularly to the sheets; see Fig. 1A wherein corresponding parts of the duplex set are indicated by the same reference numerals as on Fig. 1 with the addition of the reference letter "a" as to the second set. Thus for example the first or latitude circle 6 has a counterpart 6a, parallel to the first one and with its center coaxial with the center O. Similarly the second or longitude circle 10 has a counterpart 10a centered coaxially with the center O'. Each of these duplicatory circles has its corresponding alidades, telescopes, light projectors and view strips as already described in connection with Fig. 1. The construction and arrangement of the two sets of parts is such that, according to the values of the equation elements involved, the instrument parts referring to them in the two sets can be relatively displaced, to assume different positions in the two sections of the instrument if the values, measured or to be computed, differ in one observation from those in the other.

*The simultaneous determination of latitude and longitude*

We will first consider a case in which the observer's position is unchanged between observations.

Since in this instance the latitude is the same, at both times of observation, the two alidades 7 of the two latitude circles 6 and 6a must coincide. Their clamping means accordingly is such that they may be secured together, with zero angle between them, for angular movement in unison, noting the releasable cross connection 70, Fig. 1A. If these circles 6 and 6a are to be read directly in values of latitude ($\lambda$), rather than in terms of the observer's polar distance, their degree graduations are made to read from 0 (zero) at the point E, Fig. 1.

A somewhat similar but modified condition applies as to the two alidades and parallelogram members 11—16 of the dual sets. If, as is generally the case, the declinations ($\delta$) of the two observed bodies are not the same, the positions of the beam-line defining bars 16, 16 ($R'R^2$) are not the same in the respective parallelograms. We now wish to use the circle 10 and its counterpart 10a to designate longitude (L) (rather than hour-angle as heretofore). The scale 0 (zero) points are then taken as representing the meridian of Greenwich (or the 0-meridian of whatever system is used). Accordingly one alidade 11 is clamped on the point F of its circle corresponding to the Greenwich hour angle (TG) of the first body observed. The observer's local longitude plus the local hour-angle of the celestial body equals the Greenwich hour-angle of that body. This will be stated thus:

$$L+A \text{ or } L+t=TG$$

Accordingly the reading of the degree scale opposite the bottom point K, Fig. 1, will be directly in longitude as soon as the angle KO'F defined by the alidade 11 equals $t$, i. e., as soon as the true solution of the triangle is found; see also Fig. 6.

As previously indicated, the second circles 10, 10a, at the right portion of the instrument, Fig. 1, having the parallelograms associated with them, are revoluble about their centers at O', on a common supporting axis 21, Fig. 1A. The two circles, however, move angularly in unison, being connected so as to have no relative motion, noting the releasable cross-connecting clamp 100, Fig. 1A. The origins or 0 (zero) marks of their degree scales are at parallel radii, so that the readings of longitude will be the same on both circles, or on both faces of a single circle, as is desired.

Having clamped the alidade 11 of one longitude circle 10 at a point F corresponding to TG, the alidade 11 for the other longitude circle is clamped at a point F thereon corresponding to TG', the Greenwich hour-angle of the second body at the time of the second observation.

The alidade settings for the longitude circles as just above explained will be clearly understood by reference to Fig. 6, a diagrammatic illustration of one of them. There an alidade 11 is shown clamped at a position marked TG, also F, corresponding to the Greenwich hour-angle of the first observed body. The 0 (zero) radius is there marked Greenwich. The dotted angle between said 0 (zero) radius and the alidade 11, indicated by the dotted arrow, equals TG. The angle $t$ between the alidade and the perpendicular radius at the point K, Fig. 1, is obtained by the correct manipulation of the instrument in solving the problem. From the above formula $L+t=TG$ we have $TG-t=L$. Therefore, in Fig. 6, the total angle less the smaller angle $t$ gives us the angle L, indicated by the arrow between the 0 (zero) radius and the perpendicular radius at K. Hence the reading at K is directly in longitude. It is evident that with the plural circles of longitude as herein disclosed, with capacity for relative adjustment and interconnection to set them with an angle between their initial or "zero" radii, the computing intrument of the invention is equally applicable to positional computations in connection with which terrestrial stations instead of celestial bodies are observed.

By way of comparison with the use of the instrument in the previous problem of solving the single spherical triangle, the setting for the circle 10 is as diagrammed in Fig. 5. Assuming the reading is to be from left to right, the 0 (zero) of the scale may be fixedly set at the bottom point, in line with the vertical radius as indicated. Where problems of longitude are not involved it may remain so set. Angular movement of the alidade 11 until the equation is solved by the setting of the instrument to bring the line of sight and the beam line into intersection at the view strip 20 then gives true readings for angle $t$ at the point so marked on Fig. 5.

From the foregoing it is evident that in its dual form the instrument affords direct readings in latitude and longitude of the observer. The procedure is to start with an assumed value for the latitude for instance; that is, with a certain trial inclination of the first latitude alidade 7. The line of sight NQ of its telescope defines a point Q upon the view strip 20. The corresponding longitude alidade 11 is moved until the shadow of the cross-hairs of the projector strikes the same point Q on the view strip 20. Under the settings of the parts as above explained we will then read at K the desired longitude, but only if, perchance, the initially assumed value for the latitude happened to be the true one. If such were the case, an observation through the other telescope of the dual set of parts would also show intersection of its line of sight with the cross-hair shadow projected on the corresponding view strip 20 from the light projector of the second set. It is unlikely that this simultaneous or coincident occurrence of intersection as to the sight lines and the beam lines for the two sets of parts will be had upon a first trial. Corrections accordingly are made.

Any necessary correction may readily be accomplished by a procedure for successively halving the differences as between the conditions of intersection upon the two symmetrical view strips 20, each time bringing them closer to the desired condition of simultaneous or coincident intersection of their respective line pairs, establishing true values of latitude and longitude.

Assume for example that upon looking in the second telescope it is noted that the sight line and the beam line are out of intersection, by an amount $x$. Then the corresponding alidade 11 of the longitude circle 10a of the second set is moved until intersection of the sight line and light beam is established at a point $Q'$, for this second set of parts. The alidade motion is then reversed and is stopped at approximately one-half the distance $x$. This new setting in effect takes the actual longitude value as a new assumption. With that as a basis, the respective latitude alidades 7 of the two circles 6, 6a are manipulated by a similar procedure. That is, first one of them is moved until the corresponding sight line intersects the cross-hairs shadow at the view strip, then the second telescope is adjusted and brought half-way back, i. e. through one-half the difference between their non-coincident intersection conditions. In the course of but two or three trials the desired condition of actual coincidence, that is, a condition of simultaneous intersection by the respective lines upon both view strips 20, is reached. The readings opposite the points M and K, Fig. 1, will then be the observer's latitude and longitude respectively.

In connection with these correction trials there is no need of making actual readings of the provisional values indicated. The entire manipulation is merely a matter of sighting first through one telescope and then through the other and adjusting the clamping means.

The foregoing correctional procedure is represented graphically in the diagram of Fig. 4.

There two circles of position C and C² are indicated, defined by the two observations. Their intersection at the point Z is the observer's location sought. The first assumption of latitude being for instance $\lambda$, the longitudes which would appear on the instrument would be L on the first longitude circle (point $a$), and L² on the second longitude circle (point $b$). If one turns back half-way from L² toward L, stopping say at LX, and then adjusts the readings of latitude, an angle $\lambda x$ would appear on the first latitude circle and an angle $\lambda x^2$ on the second. Again halving these readings gives latitude $\lambda xx$, and the corresponding two new longitudes Lx and Lx² for the circles C and C² respectively. These are nearly coincident, and by halving them, as at Lxx, the result is very close to or precisely at the true longitude, from which is also had the true latitude, that is, the point Z. This manipulative adjustment is more time consuming in the explanation than in the performance. With but little practice it can be accomplished in a few seconds.

This operation has no counterpart in the usual "pencil and paper" or charting and plotting procedure for obtaining latitude and longitude. Under such previous procedure it was necessary to compute, at the expense of considerable time, the points corresponding to $a$ and $b$, Fig. 4, and to draft and determine the directions of the tangents to the two position circles at said points.

To avoid repetition of the calculations, the intersection of such tangents was accepted as being the point Z, which it is not. The error was all the greater if the initially assumed latitude approximation, supplied by dead reckoning, was actually considerably out of the way. But in the use of the instrument of the invention any error in the first-assumed latitude is immaterial, being fully corrected by the described procedure.

There remains for consideration the problem in which the observer moves, as with a ship or airplane, between the two observations. From the foregoing explanation the nature of the correction for the observer's displacement will readily be seen.

If it is desired to obtain the readings for the observer's position at the time of the second observation, obviously no correction need be introduced in the setting of the second or part-two section of the instrument; any adjustment would be made only as to the parts pertaining to the first observation.

Assume, by way of example, that between the two observations the observer's latitude has increased to a small extent designated as $\Delta\lambda$. If then the latitude alidade 7 for the first observation is set with its line MO not parallel to its analogue, but instead with a lag equivalent to $\Delta\lambda$, the appropriate correction is automatically applied. The desired latitude reading will be taken upon the second latitude circle 6a, since the reading upon the first one, corresponding to the latitude at the instant of the first observation, will differ from the second by said amount $\Delta\lambda$.

Similarly, if there is an increase in longitude by an amount $\Delta L$, the longitude alidade 11 will be set with its line O'S' not at the reading TG (Fig. 6) but instead at a reading $TG+\Delta L$. The longitude reading will be the same on both longitude circles 10 and 10a. This is evident from the following considerations, already pointed out in connection with Fig. 6:

$$t+L=TG \text{ and } t^2+L^2=TG^2$$

since $$L=L^2-\Delta L, TG=t+L^2-\Delta L \text{ or } t+L^2=(TG+\Delta L)$$

The last relation in effect asserts that if the reading at K is L² and the angle between O'K and O'S' is $t$ (as it should be), the reading at F must be $TG+\Delta L$. The latter is the value to be set upon the instrument, initially, instead of the value TG.

It will be understood that my invention is not limited to the exemplary embodiments herein illustrated or described, and I set forth its scope in my following claims:

I claim:

1. A computing instrument comprising, in combination, a frame, latitude circle means having a fixed center thereon, longitude circle means also centered at a fixed point on the frame, a light-receiving view strip on the frame perpendicular to the line of centers of said circle means and having capacity for adjustment along a line paralleling said line of centers, a light-beam projector movably supported to project its beam always parallel to said line of centers and perpendicularly onto the view strip, a longitude alidade associated with the light-beam projector and adapted to indicate angles on the longitude circle means, a latitude alidade pivoted concentrically with the latitude circle means to mark latitude angles thereon, and a sighting device on the latitude alidade for establishing a line of sight paralleling the alidade and adapted to intersect the point of light-beam projection on the view strip, said sighting device being adjustable in self-parallelism along a line perpendicular to its alidade.

2. A computing instrument for simultaneously obtaining latitude and longitude from observational data, comprising, in combination, a frame, latitude circle means having a fixed center on the frame and presenting first and second similar symmetrically disposed latitude scales, longitude circle means centered at a fixed point on the frame and presenting first and second similar and symmetrically disposed longitude scales, light-receiving view strips on the frame perpendicular respectively to the lines of centers of the first and second portions of said circle means and with capacity for adjustment along lines paralleling said lines of centers, light-beam projectors movably supported each to project its beam always perpendicularly onto the corresponding view strip and along lines paralleling the respective lines of centers, longitude alidades associated with the respective projectors and adapted to indicate angles on the corresponding scales of the longitude circle means, latitude alidades pivoted concentrically with the respective scales of the latitude circle means to mark latitude angles thereon, and a sighting device on each latitude alidade to establish sight lines paralleling their alidades and adapted to intersect the point of light-beam projection on the corresponding view strip, said sighting devices being adjustable in self-parallelism along lines perpendicular to their respective alidades, the two sighting devices being disposed for readily bringing into simultaneous coincidence the conditions of intersection of the corresponding sight-lines and light beams at their view strips.

3. A computing instrument particularly adapted for solving certain equations for related angles, comprising, in combination, a supporting frame, a first circle thereon, a pointer arm pivoted concentrically with the circle and carrying at adjustable distance from its line an observing device having its line of sight paralleling the arm, a second circle on the frame, a light-beam-source mounted for movement with its light-beam-line at all times paralleling a straight line joining the centers of said circles, means associated with the light source for indicating angles on the second circle, a track on the frame along a straight line paralleling said line of centers, and a light-transmitting planar view strip mounted perpendicularly to said track with capacity for adjustment along it, said strip adapted to intersect at a common point the line of sight of the observing device and the light-beam-line of the light source and whereby the two may be brought into intersection at the plane of the strip under different adjusted settings of the parts.

4. A position computing instrument comprising latitude and longitude circles having their centers in fixed relation, a light-beam projector device movable in self-parallelism about the center of one circle, a sighting device movable about the center of the other circle in parallelism with a radius thereof, said projector and sighting devices facing each other, and a planar view member adjustably positioned between said devices perpendicular to the direction of a line joining the centers of the circles and adapted to indicate upon the surface thereof facing the sighting device the condition of intersection at said surface by the light-beam and the line of sight.

5. In a position computing instrument according to claim 4, a construction and arrangement wherein the longitude circle is rotatively adjustable about its center and has rotatively adjustably associated with its center an alidade and parallel-linkage system carrying the light-beam projector, whereby the alidade may be set on the circle at a degree value equal to a known Greenwich hour-angle and a related longitude value will come opposite a predetermined point with respect to the circle, under the condition of light-beam and sight-line intersection.

6. A position computing instrument comprising latitude and longitude circles having their centers in fixed relation, a light-beam projector device movable in self-parallelism about the center of one circle, a movable sighting device connected to an alidade revolving about the center of the other circle, said projector and sighting devices facing each other, and a planar view member adjustably positioned between said devices perpendicular to the direction of a line joining the centers of the circles and adapted to indicate upon the surface thereof facing the sighting device the condition of intersection at said surface by the light-beam and the line of sight.

7. In a position computing instrument according to claim 6, a construction and arrangement wherein the light-beam projector, movable in self-parallelism, is associated with an alidade which revolves about the center of a longitude circle, whereby the alidade may be set on the circle at a degree value equal to a known Greenwich hour-angle and a related longitude value will come opposite a predetermined point with respect to the circle, under the condition of light-beam and sight-line intersection.

8. An instrument for mechanically and optically obtaining simultaneous trigonometric equational values such as latitude and longitude when having the angle data of two different observations, for navigation and other purposes, said instrument comprising in combination duplex sets of parts, one set for each of the observations, each set having means for establishing in space a straight line containing the centers of circular arcs representative of latitude and of longitude, means presenting a light-receptive plane surface perpendicular to and adjustable in a rectilineal direction paralleling the line of centers thereby to position the surface according to a given angle value such as an observed declination, means for emitting a spot-light-beam at a radial distance from the longitude arc center conformant to said angle value, means enabling the spot-light-beam to be shifted in the direction to and from the line of centers and at all times parallel thereto and perpendicular to the plane surface whereby to demark hour-angles on the longitude arc and to spot-light positions on the plane surface corresponding to such hour-angles, means for directing a line of sight in a latitude-angle relation to the latitude arc and extending to the plane surface and in opposition to the spot-light-beam so as to demark the latitude-angle relation on the latitude arc, and means enabling adjustment of the beam line and the line of sight to bring them into intersection at the plane surface, the two sets being so constructed, arranged and interrelated as to produce the respective intersections simultaneously for the beam line and the sight line of each set, whereby the hour-angle demarked on the longitude arc by the light-beam adjustment is the desired longitude value and the latitude-angle relation as demarked at the latitude arc by the line of sight adjustment is the desired latitude value.

9. An instrument for determining trigonometric equational values, as for example those in spherical trigonometry involving three sides and one angle and conversely three angles and one side, whereby an unknown one of such four elements of a single triangle may be determined and value changes in one element may be observed as a function of the value of another thereof when the other two of the four elements are taken as constant, said instrument comprising, in combination, a viewing screen defining a plane surface, frame means defining two points upon a control line perpendicular to the screen, both points to one side of the screen and the nearer thereof adjustably spaced from the screen according to a known value of one of such elements, means including a light-beam source for establishing a light-beam line, also perpendicular to said screen and at the same side thereof so as to light-mark a spot thereon visible at the other side of the screen, adjustable supporting means for presenting the light-beam source in a location relative to the surface and to the control line according to known values of two of such four elements, sighting means to direct a sight-line angularly toward the screen at said other side thereof so as to intersect the light-marked spot, and adjustable positioning devices for lineally adjusting the sighting means along an adjusting line perpendicular to a radial line from that one of the control line points which is nearer the screen and for angularly adjusting said radial line and the sighting means with respect to the control line, both said adjustments also according to known element values, said light-beam supporting means and said adjustable positioning devices affording to the sight-line and the light-beam line capacity for relative shifting each in self-parallelism to intersect each other at the light-marked spot on the screen so that the sight-line angle indicates a value of the unknown element.

LINO L. SA PEREIRA.

REFERENCES CITED

The following references are of record in the file of this patent:

UNITED STATES PATENTS

| Number | Name | Date |
|---|---|---|
| 464,261 | Beehler | Dec. 1, 1891 |
| 1,640,328 | Koffskey | Aug. 23, 1927 |
| 1,770,461 | Cogshall | July 15, 1930 |
| 1,512,856 | Nuschak | Oct. 21, 1924 |